Inventors:
Vernon S. Danielson.
William D. Wallace.
By Henry Fuchs
Atty.

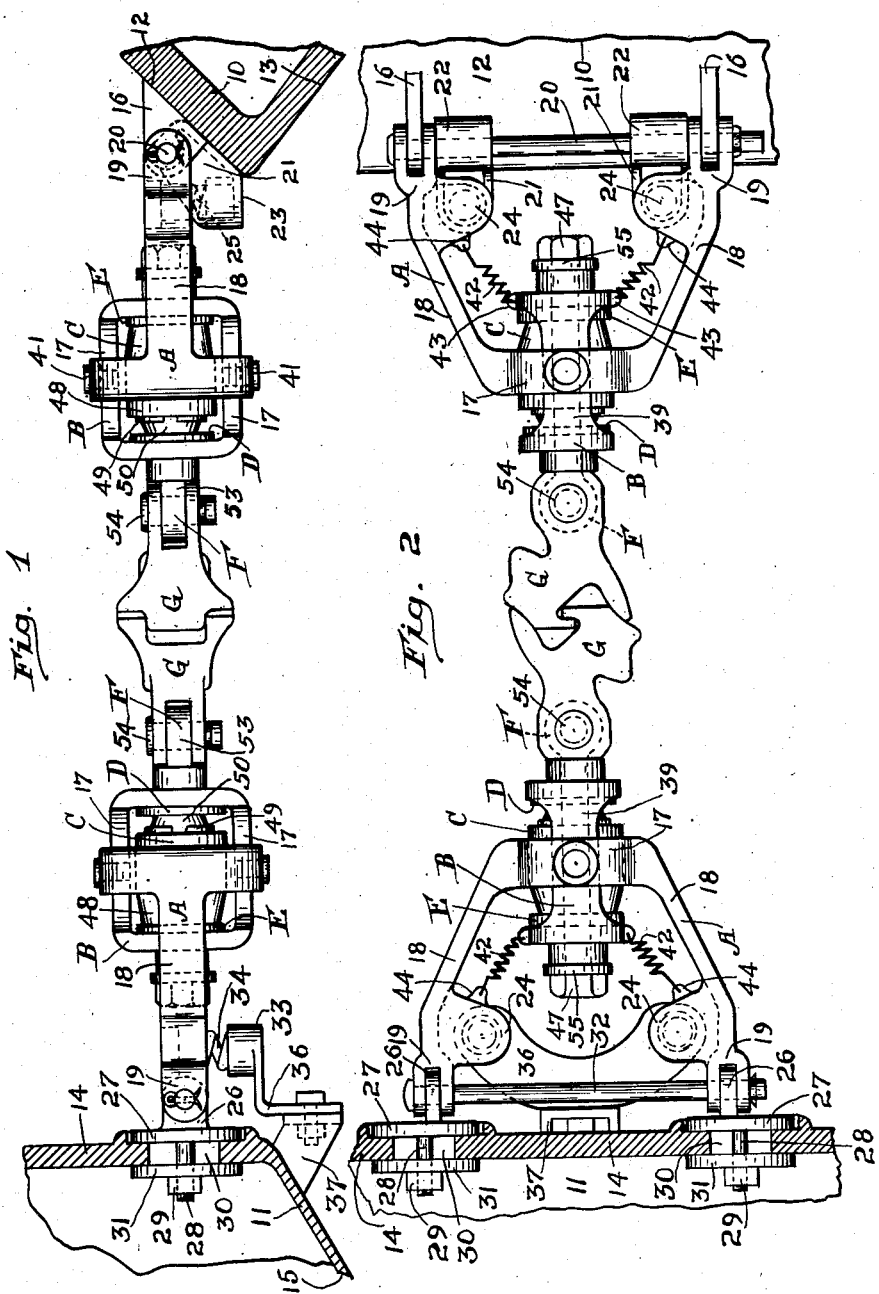

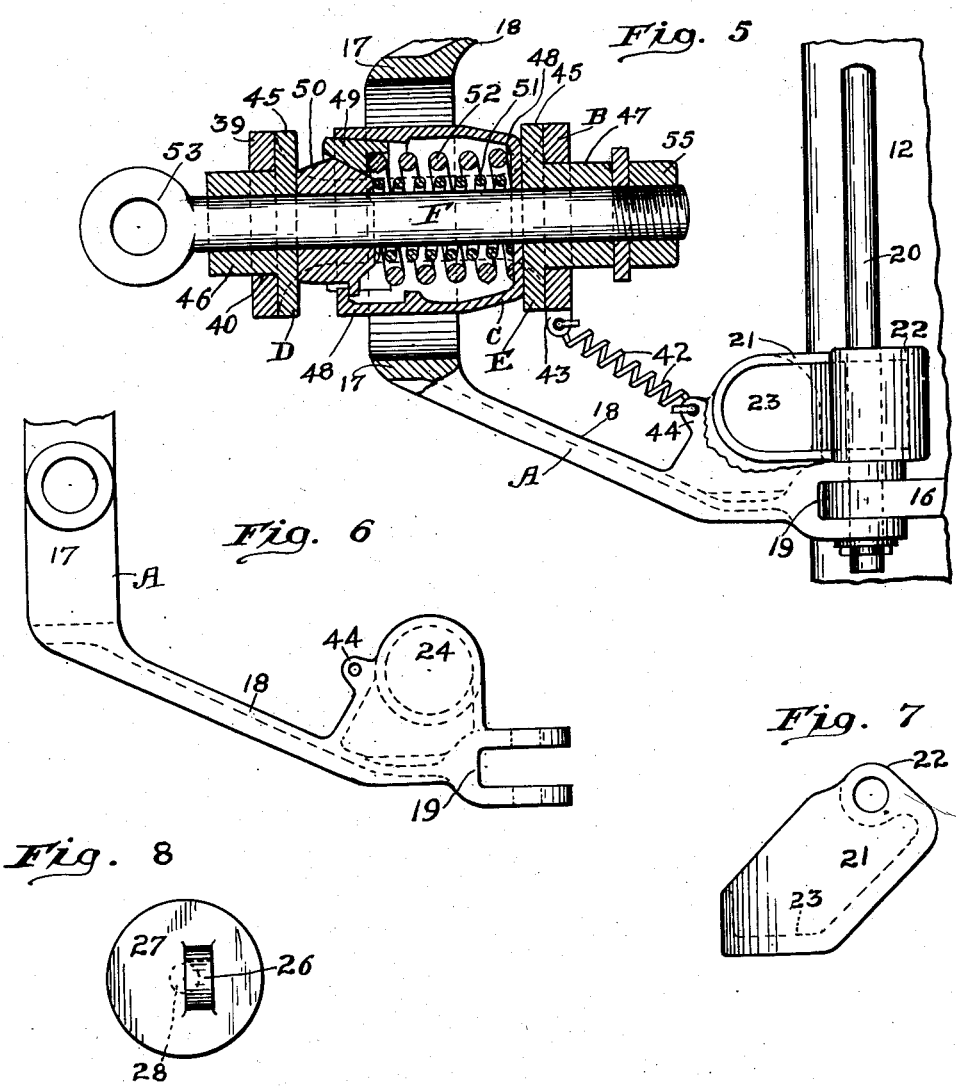

Patented May 12, 1953

2,638,353

UNITED STATES PATENT OFFICE 2,638,353

DRAFT AND BUFFER RIGGING FOR VEHICLES

Vernon S. Danielson, Dolton, and William D. Wallace, Park Forest, Ill., assignors to W. H. Miner, Inc., Chicago, Ill., a corporation of Delaware Application July 11, 1951, Serial No. 236,212

9 Claims. (Cl. 280—33.9)

This invention relates to improvements in draft and buffer riggings for vehicles, and more particularly for such vehicles as army tanks.

One object of the invention is to provide draft and buffer riggings for vehicles, such as army tanks, adapted to be coupled to each other, including a friction shock absorbing device designed to cushion draft and buffing shocks, wherein the friction shock absorbing device is connected to the coupler by a drawbar in the form of a bolt extending through the friction shock absorbing device and cooperating with followers at opposite ends of the device for actuating the latter in buff and draft, wherein the friction shock absorbing device is mounted on the tank by means of a support pivotally connected to the tank for swinging movement on a horizontal axis, and wherein the friction device is mounted in said support for pivotal movement about a vertical axis, whereby the coupling means has universal pivotal movement with respect to the tank on which it is mounted, and is also rotatably adjustable about its longitudinal axis.

A more specific object of the invention is to provide a draft and buffer rigging for vehicles, comprising a supporting frame structure pivotally connected to the vehicle for swinging movement in a vertical plane, a friction shock absorbing device including a friction casing and a spring resisted friction clutch, the friction casing being pivotally mounted on the supporting frame for swivelling movement about a vertical axis, and a drawbar in the form of a bolt extending through the casing, and followers at opposite ends of the friction shock absorbing device with which said bolt cooperates to actuate the friction shock absorbing device in buff and draft, the drawbar being rotatable about its longitudinal axis, thereby providing for adjustment thereof, in service, about its longitudinal axis, as well as universal pivotal movement thereof provided by the swivelled connection of the shock absorbing device with the supporting frame and pivoted connection of the latter with the vehicle.

Other objects of the invention will more clearly appear from the description and claims hereinafter following.

Figure 3:
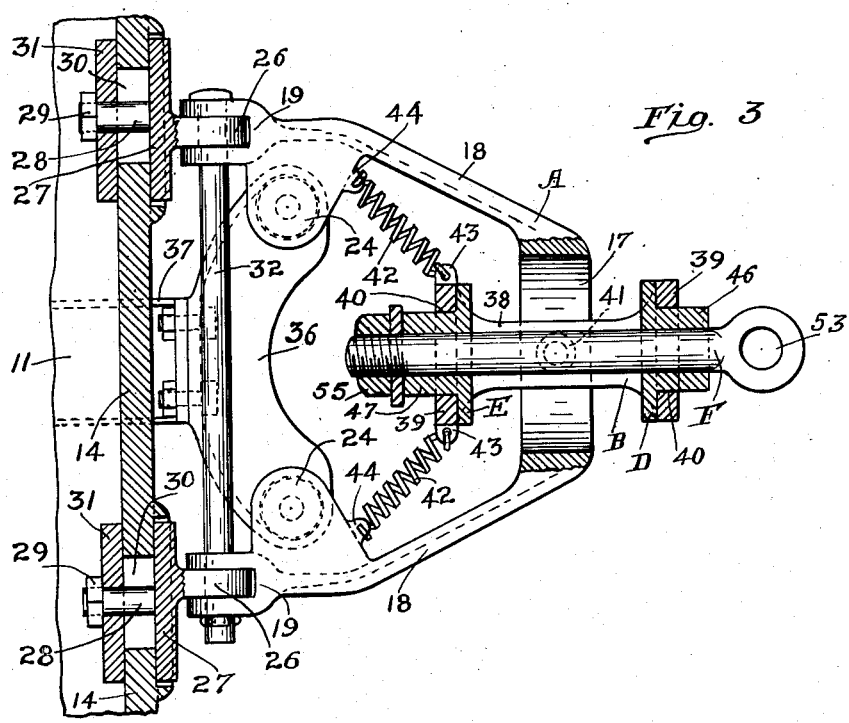
Figure 4:
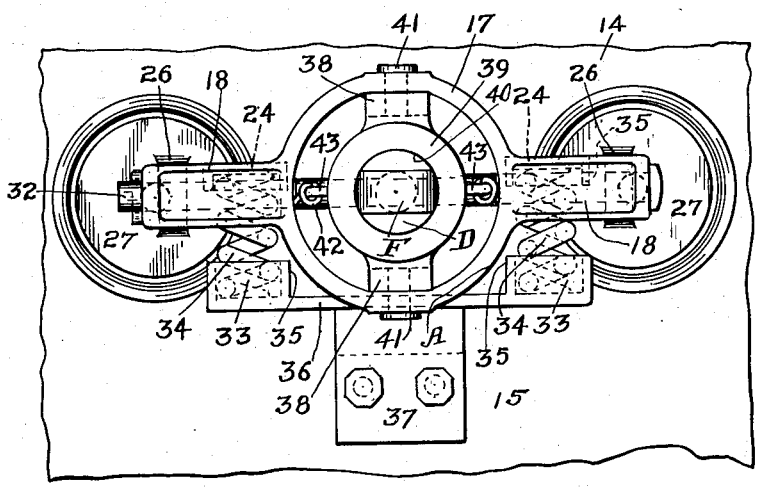

In the accompanying drawings forming a part of this specification, Figure 1 is a side elevational view of our improved draft and buffer rigging, illustrating the same applied to the front and rear ends of a pair of coupled army tanks, the end portions of the tanks being shown broken away and in vertical longitudinal section. Figure 2 is a top plan view of Figure 1, with the end portion of the tank at the left hand side shown in horizontal section. Figure 3 is a view on an enlarged scale, similar to Figure 2, showing only the mechanism at the left hand side of Figure 2, with the friction shock absorbing device and the coupler omitted, and certain parts in horizontal longitudinal section. Figure 4 is an elevational view of Figure 3, looking from right to left in said figure. Figure 5 is a broken view on an enlarged scale, similar to Figure 2, of the mechanism at the right hand side of said figure, showing the friction shock absorbing device and associated parts in horizontal section. Figure 6 is a broken plan view of the supporting members shown in Figure 5. Figure 7 is a side view of the spring supporting bracket shown in Figure 5. Figure 8 is an elevational view of the supporting bracket at the left hand side of Figure 4.

As shown in the drawings, our improvements comprise draft and buffer riggings applied to both the front and rear ends of army tanks, the constructions of these draft and buffer riggings being substantially the same, with the exception of certain modifications which are necessary to adapt them to the specific designs of the front and rear end structures of the tanks.

As illustrated in the drawings, each draft and buffer rigging comprises broadly a supporting frame A, pivotally connected to one end of the army tank for swinging movement in a vertical plane, a carrier B swiveled on the supporting frame for rotation about a vertical axis, a friction shock absorber C supported within the carrier, outer and inner followers D and E within the carrier cooperating with the friction shock absorber, a drawbar F extending through the friction shock absorber and follower, and a coupler G connected to the drawbar F.

In the drawings, the front end portion 10 of a well-known design of army tank is shown at the right hand sides of Figures 1 and 2, and the rear end portion 11 of a similar army tank is shown at the left hand sides of these figures. The end portion 10 of the first named army tank includes a forwardly extending, downwardly inclined, upper wall portion 12 and a lower wall portion 13 extending downwardly from the wall portion 12. The end portion 11 of the second named army tank includes a vertically extending wall portion 14, and a lower inclined wall portion 15 extending downwardly and inwardly from the wall portion 14.

In carrying out our invention, suitable brackets are provided on the front and rear end portions of the army tanks for attachment of our improved draft and buffer riggings, the brackets which are provided on the front end portion 10 of the tank being in the form of outstanding, laterally spaced ears 16—16, projecting from the wall portion 12, these ears being provided with aligned perforations adapted to receive a pivot pin.

The supporting frame A of each draft and buffer rigging includes a transversely disposed ring member, and a pair of laterally spaced, diverging arms 18—18 on opposite sides of the ring member. The arms 18—18 are forked at their free ends, as indicated at 19—19, the forked portions of the arms 18—18 of the supporting frame A, which is attached to the tank front end portion 10, being engaged over the ears 16—16 and attached thereto by an elongated pivot pin 20 extending through perforations in said ears and suitable pivot pin receiving openings in the forked portions. The single pivot pin 20 extends through both arms 18—18 and both of the ears 16—16. The front end portion 10 of the tank also carries a pair of laterally spaced, spring supports 21—21, which rest on the wall 12 and have upstanding enlargements 22—22 thereon supported on the pivot pin 20, these enlargements being perforated to receive the pivot pin which extends therethrough. The supports 21—21 are located on the pin 20 inwardly of the arms 18—18 of the corresponding supporting frame A and have projecting spring supporting shelf portions 23—23 thereon, located outwardly beyond the end of the wall 12 of the tank. Each supporting frame A has laterally inwardly projecting, horizontal spring abutments 24—24 at the free ends of the arms 18—18 thereof, said spring abutments being on the inner sides of said arms 18—18, adjacent the forked end portions 19—19 of said arms. The shelf portions 23—23 of the spring supports 21—21 are in vertical alignment, respectively, with the spring abutments 24—24 of the supporting frame A, which is mounted on the tank end 10. Springs 25—25 are interposed between the spring abutments 24—24 and shelves of the spring supports 21—21, to sustain the supporting frame A referred to, in horizontal position.

Brackets for mounting the supporting frame A of the draft and buffer rigging, which is attached to the tank rear end portion 11, comprise a pair of laterally spaced ears 26—26 projecting from the wall 14 of the tank end 11. Each ear 26 has a disclike base portion 27, provided with a projecting central stem 28, which is threaded at its outer end to receive a nut 29. The end wall portion 14 of the tank end portion 11 is provided with suitable, laterally spaced openings 30—30 to facilitate attachment of the ears 26—26 to said wall portion. Each ear 26 has the base 27 thereof abutting the outer side of the wall portion 14 at one of said openings 30, with the stem 28 extending through said opening. This ear 26 is clamped in fixed position on said wall portion by the nut 29, a washer 31 being interposed between said nut and the inner side of the wall portion 14, the washer overlying the corresponding opening 30.

The supporting frame A, which is mounted on the tank portion 11, has the forked end portions 19—19 of the arms 18—18 thereof engaged over the ears 26—26. An elongated pivot pin 32, similar to the pivot pin 20 hereinbefore described, extends through said ears and the forked portions of said arms and serves to connect the last named frame A to the tank end 11 for swinging movement. As will be evident, the supporting frames A—A of the draft riggings are thus pivotally mounted for swinging movement in vertical planes. The tank end 11 is also provided with spring supports 33—33, which are vertically aligned with the spring abutments 24—24 of the supporting frame A, which is attached to said tank end. Springs 34—34 supported on said brackets and bearing at their upper ends on said spring abutments 24—24 sustain the supporting frame A last referred to in horizontal position. Each spring support 33 is in the form of a cup in which the corresponding spring is seated. Said spring supports are carried by a bracket 36 bolted to a suitable support 37 fixed to the wall 15 of the tank end 11.

The carrier B of each draft and buffer rigging is in the form of a yoke having top and bottom arms 38—38 connected by vertical end sections 39—39. The end sections 39—39 are provided with aligned openings 40—40 adapted to accommodate portions of the followers D and E. The carrier B is disposed within the ring 17 of the corresponding supporting frame A and is swivelled to said frame for rotation about a vertical axis by top and bottom pivot pins 41—41 engaged through suitable openings in the top and bottom arms of the carrier and said ring 17. The carrier B of each draft and buffer ring is held centered by tension springs 42—42 attached to opposite sides of the inner end of the carrier and the arms 18—18 of the corresponding supporting frame A. The inner vertical section of the carrier B is provided with lugs 43—43 and the spring abutments 24—24 of the arms 18—18 of said frame are provided with lugs 44—44 to which the opposite ends of said springs 42—42 are fixed.

The followers D and E of each draft and buffer rigging are arranged at opposite ends of the carrier B thereof. Each follower D and E comprises a disclike section 45 disposed within the carrier B and an outwardly projecting cylindrical stem, the stem of the follower D being indicated by 46 and projecting through the opening 40 of the vertical end section 39 of the carrier B, and the stem of the follower E being indicated by 47 and projecting through the opening 40 of the vertical end section.

The friction shock absorber C of each draft and buffer rigging is of well-known design, and comprises a friction casing 48, friction shoes 49—49 slidingly telescoped within the casing, a block 50 in wedging engagement with the shoes, and springs 51 and 52 within the casing yieldingly opposing inward movement of the shoes. The friction shock absorber C is disposed within the carrier B between the followers D and E with the wedge block 50 bearing on the disc section 45 of the follower D, and the closed end of the casing 48 bearing on the disc section 45 of the follower E.

The drawbar F of each of said draft and buffer riggings is in the form of an elongated cylindrical bar having an eye member 53 at its outer end to which the stem of the coupler G, which coupler is of any well-known design, is connected by a pivot pin 54 extending through said stem and the eye member 53. The cylindrical shank portion of the drawbar F extends through suitable, longitudinally aligned openings in the followers D and E, wedge block 50, and the casing 48, and a nut 55, threaded on the shank of the same, bears on the outer side of the follower E. The follower E is thus connected to the drawbar F for movement in unison therewith in draft; and the follower D and drawbar F are thus relatively movable and rotatable with respect to each other.

In draft, the drawbar pulls the follower E forwardly therewith, thus compressing the friction shock absorber C against the follower D which is held stationary by engagement with the corresponding vertical end section 39 of the carrier B.

The coupler G, which is fixed to the drawbar F, is arranged and designed so that the inner end of the shank of the coupler engages the outer end of the stem 46 of the follower D in buff, thus forcing the follower D toward the follower E and compressing the friction shock absorber therebetween.

As will be evident, the arrangement and design of our improved draft and buffer rigging provides for universal connection between army tanks, the carrier B being swivelled for rotation in its supporting frame about a vertical axis at right angles to the pivotal axis of said supporting frame. It is further pointed out that the drawbar connection with the followers D and E and friction shock absorber C provides for rotary adjustment of the drawbar and coupler in service, the drawbar being rotatable in the follower D and the follower E, which is fixed to the drawbar, being rotatable in the carrier B.

We claim:

1. In a draft rigging for vehicles, the combination with a supporting frame pivotally connected to the vehicle for swinging movement in a vertical plane; of a carrier swivelled on said frame for rotation about a vertical axis; a friction shock absorber within said carrier; inner and outer abutments on said carrier; followers at opposite ends of said friction shock absorber; a drawbar connected to the inner follower to actuate the same in draft, said drawbar being rotatable about its longitudinal axis with respect to said followers; and a coupler fixed to the outer end of the drawbar and engageable with the outer follower to actuate the same in buff.

2. In a draft rigging for vehicles, the combination with a supporting frame hinged at one end on said vehicle for swinging movement in a vertical plane; of a carrier swivelled on said frame for rotation about a vertical axis; a friction shock absorber within the carrier, said shock absorber including a friction casing and a spring resisted clutch slidable in the casing; followers bearing on opposite ends of said friction shock absorber; stops on the carrier limiting separation of said followers lengthwise of the mechanism; and a cylindrical drawbar extending through said followers and friction shock absorber, said drawbar having shouldered engagement with one of said followers to actuate the same in one direction and being axially rotatable in both of said followers.

3. In a draft rigging for vehicles, the combination with a supporting frame comprising a ring member and side arms extending rearwardly from said ring member, the ends of said arms remote from said ring member being pivotally connected to the vehicle for swinging movement about a horizontal axis; a carrier having top and bottom trunnions journaled in bearing openings in the top and bottom of said ring member; inner and outer stop means on said carrier; a friction shock absorber within the carrier; followers bearing on opposite ends of said friction shock absorber; and a drawbar extending through said followers and friction shock absorber, said drawbar being axially rotatable in both of said followers and being connected to said inner follower to move the latter in draft.

4. In a draft rigging for vehicles, the combination with a supporting frame comprising a circular loop member provided with arms on opposite sides thereof extending lengthwise of the mechanism, said arms being pivotally connected to the vehicle for swinging movement in a vertical plane; a carrier within the loop member; pivot means at the top and bottom of said carrier journaled in the top and bottom wall portions of said loop member for rotation about a vertical axis, said carrier having inner and outer stops; inner and outer followers abutting said inner and outer stops; a friction shock absorber within the carrier between said followers; and a lengthwise extending drawbar journaled in both of said followers and said shock absorber for rotation about a horizontal axis, said inner follower being connected to the drawbar for movement therewith in draft, and journaled for rotation in said carrier about the longitudinal axis of said carrier, said drawbar having a coupler connected thereto.

5. In a draft rigging for vehicles, the combination with a supporting frame swingingly mounted at one end on the vehicle; of a carrier journaled in the other end of said frame for rotation about an axis at right angles to the axis of swinging movement of said frame, said carrier having lengthwise extending, top and bottom arms and vertical, inner and outer end sections connecting said arms, said end sections having longitudinally aligned bearing openings therein; inner and outer followers within the carrier bearing, respectively, on the inner sides of said end sections, each of said followers having a projecting stem extending through the opening of the adjacent end section of said carrier; a friction shock absorber interposed between said followers; and a cylindrical drawbar extending through said inner and outer followers, and through said shock absorber, said drawbar being connected to said inner follower to actuate the same in draft, and journaled for rotation in both of said followers.

6. In a draft rigging for vehicles, the combination with a supporting frame pivotally connected at one end to the vehicle for swinging movement; of a carrier swivelled in the other end of said frame for rotation about an axis at right angles to the axis of swinging movement of said frame; a friction shock absorber mounted in said carrier; a pair of end followers mounted in said carrier, said followers engaging opposite ends of said shock absorber; and a drawbar extending through said followers and shock absorber, said drawbar being mounted for axial rotation in both of said followers and being connected to the other follower to actuate the same in draft, and said followers being mounted in said carrier for rotation about the longitudinal axis of said drawbar.

7. In a draft rigging for vehicles, the combination with a supporting frame pivotally connected to the vehicle for swinging movement in a vertical plane; of a spring abutment on said vehicle below said frame; a spring reacting between said abutment and frame for supporting the latter in horizontal position; a carrier swivelled on said frame for rotation about a vertical axis; a friction shock absorber within said carrier; inner and outer abutments on said carrier; followers at opposite ends of said friction shock absorber; a drawbar connected to the inner follower to actuate the same in draft, said drawbar being rotatable with respect to both of said followers; and a coupler fixed to the outer end of the drawbar and engageable with the outer follower to actuate the same in buff.

8. In a draft rigging for vehicles, the combination with a supporting frame pivotally connected to the vehicle for swinging movement in a vertical plane; of a carrier swivelled on said frame for rotation about a vertical axis; a friction shock absorber within said carrier; inner and outer abutments on said carrier; followers at opposite ends of said friction shock absorber; a drawbar connected to the inner follower to actuate the same in draft, said drawbar being rotatable with respect to both of said followers, said drawbar having an eye at its outer end; and a coupler fixed to the outer end of the drawbar and engageable with the outer follower to actuate the same in buff, said coupler being connected to said drawbar by a pin extending through the eye of the drawbar.

9. In a draft rigging for vehicles, the combination with a supporting frame pivotally connected at one end to the vehicle for swinging movement in a vertical plane; of an elongated carrier swivelled between its ends on the other end of said frame for rotation about a vertical axis; tension springs connected at their outer ends to opposite sides of said carrier at the inner end of the latter, said tension springs extending to the inner end of said frame, in diverging relation, and having their ends fixed to said frame; a friction shock absorber within said carrier; inner and outer abutments on said carrier; followers at opposite ends of said friction shock absorber; a drawbar extending through said outer follower and connected to said inner follower to actuate the same in draft; and a coupler fixed to the outer end of said drawbar.

VERNON S. DANIELSON.
WILLIAM D. WALLACE.

References Cited in the file of this patent

UNITED STATES PATENTS

| Number | Name | Date |
|---|---|---|
| 1,183,880 | Johnston | May 23, 1916 |
| 1,754,309 | Cowell | Apr. 15, 1930 |
| 2,403,585 | Dath et al. | July 9, 1946 |

FOREIGN PATENTS

| Number | Country | Date |
|---|---|---|
| 18,629 | Australia | July 26, 1934 |